(12) United States Patent
Coker et al.

(10) Patent No.: US 6,937,650 B2
(45) Date of Patent: Aug. 30, 2005

(54) METHOD AND APPARATUS FOR CHANNEL EQUALIZATION WITH A DIGITAL FIR FILTER USING A PSEUDO RANDOM SEQUENCE

(75) Inventors: Jonathan Darrel Coker, Rochester, MN (US); Richard Leo Galbraith, Rochester, MN (US); Eric James Tree, Rochester, MN (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 1003 days.

(21) Appl. No.: 09/862,019

(22) Filed: May 21, 2001

(65) Prior Publication Data

US 2003/0028833 A1 Feb. 6, 2003

(51) Int. Cl.[7] .............................................. H04K 5/159
(52) U.S. Cl. ..................................... 375/232; 375/350
(58) Field of Search ................................ 375/232, 233, 375/350; 360/25, 65; 708/323

(56) References Cited

U.S. PATENT DOCUMENTS

| | | | | |
|---|---|---|---|---|
| 5,854,717 A | * | 12/1998 | Minuhin | 360/65 |
| 6,151,358 A | * | 11/2000 | Lee et al. | 375/232 |
| 6,208,477 B1 | * | 3/2001 | Cloke et al. | 360/31 |
| 6,636,372 B1 | * | 10/2003 | Nguyen et al. | 360/31 |

* cited by examiner

Primary Examiner—Don N. Vo
(74) Attorney, Agent, or Firm—Joan Pennington

(57) ABSTRACT

A method and apparatus are provided for channel equalization with a digital finite impulse response (DFIR) filter using a pseudo random sequence. A readback signal of a pseudo random bit sequence is obtained. Samples are obtained from the readback signal of the pseudo random bit sequence. Tap gradients are calculated responsive to the obtained samples. The tap weights of the digital finite impulse response (FIR) filter are modified responsive to the calculated tap gradients. Dibit samples and error samples are obtained from the readback signal of the pseudo random bit sequence and applied to a tap gradients calculator. Tap gradients are calculated by a bitwise multiplier and accumulation tap gradient calculation circuit. An attenuation function attenuates the calculated tap gradients by a programmable attenuation value.

18 Claims, 2 Drawing Sheets

METHOD AND APPARATUS FOR CHANNEL EQUALIZATION WITH A DIGITAL FIR FILTER USING A PSEUDO RANDOM SEQUENCE

FIELD OF THE INVENTION

The present invention relates generally to the data processing field, and more particularly, relates to a method and apparatus for channel equalization with a digital finite impulse response (DFIR) filter using a pseudo random sequence in a direct access storage device (DASD) data channel.

DESCRIPTION OF THE RELATED ART

Direct access storage devices (DASDs) often incorporating stacked, commonly rotated rigid magnetic disks are used for storage of data in magnetic form on the disk surfaces. Data is recorded in concentric, radially spaced data information tracks arrayed on the surfaces of the disks. Transducer heads driven in a path toward and away from the drive axis write data to the disks and read data from the disks. Typically servo information is provided on one or more disk surfaces for reading by the transducer heads for accurately and reliably positioning transducer heads on the disk surfaces at a specific location to read and write data.

In today's disk drives the readback signal typically is equalized using a finite impulse response (FIR) filter. There are numerous algorithms used to find the FIR tap weights that will result in giving the optimum channel equalization. A need exists for an improved method for channel equalization with a digital FIR filter. In current DASD data channels, channel equalization typically is achieved using extensive software algorithms. The known software algorithms are very time consuming, both during manufacture and use of the disk drive.

In earlier generations of DASD data channels, a common method of equalization used a method to reduce the Mean Square Error (MSE) of the equalized samples. Earlier designs suffered accuracy from noisy read back signals inherent in the channel.

A need exists for an improved method and apparatus for channel equalization with digital finite impulse response (DFIR) filter. A need exists for an improved equalization method that will eliminate the need for extensive software programs, as well as save time during manufacturing programming.

SUMMARY OF THE INVENTION

A principal object of the present invention is to provide a method and apparatus for channel equalization with a digital finite impulse response (DFIR) filter using a pseudo random sequence. Other important objects of the present invention are to provide such method and apparatus for channel equalization with a digital finite impulse response (DFIR) filter using a pseudo random sequence substantially without negative effect and that overcome many of the disadvantages of prior art arrangements.

In brief, a method and apparatus are provided for channel equalization with a digital finite impulse response (DFIR) filter using a pseudo random sequence. A readback signal of a pseudo random bit sequence is obtained. Samples are obtained from the readback signal of the pseudo random bit sequence. Tap gradients are calculated responsive to the obtained samples. The tap weights of the digital finite impulse response (DFIR) filter are modified responsive to the calculated tap gradients.

In accordance with features of the invention, dibit samples and error samples are obtained from the readback signal of the pseudo random bit sequence and applied to a tap gradients calculator. Tap gradients are calculated by a bitwise multiplier and accumulation tap gradient calculation circuit. An attenuation function attenuates the calculated tap gradients by a programmable attenuation value.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 1:
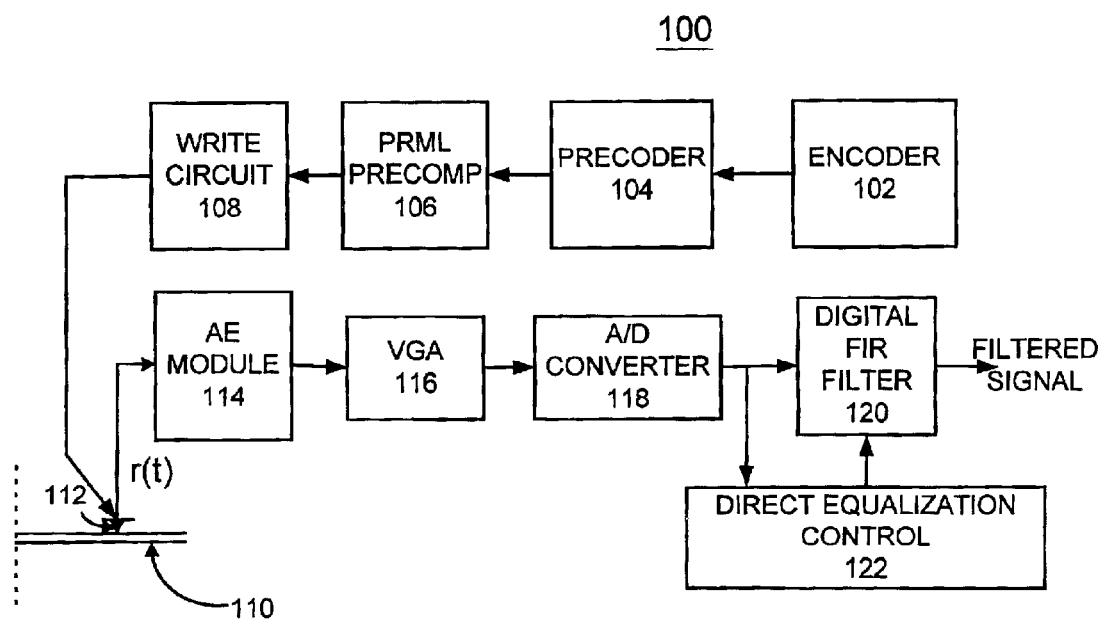
FIG. 1 is a block diagram representation illustrating a DASD data read channel for implementing methods for channel equalization with a digital finite impulse response (DFIR) filter using a pseudo random sequence in accordance with the preferred embodiment.

Having reference now to the drawings, in FIG. 1, there is shown a direct access storage device (DASD) data channel for implementing methods for channel equalization with a digital finite impulse response (DFIR) filter in accordance with the preferred embodiment generally designated by the reference character 100. Direct access storage device (DASD) 100 includes a direct equalization control function 122 for channel equalization with a digital finite impulse response (DFIR) filter in accordance with the preferred embodiment.

Data to be written is applied to an encoder 102 for providing a modulation coded output having predefined run length constraints. A precoder 104 follows the encoder 102 described by a $1/(1 \oplus D^2)$ operation where D is a unit delay operator and the symbol $\oplus$ is used to represent modulo-2 addition. Modulo-2 addition can be thought of as an exclusive or operation. A PRML precomp 106 coupled to the precoder 104 provides a modulated binary pulse signal applied to a write circuit 108 that provides the modulated write current for writing to the disk surface. As shown in FIG. 1, direct access storage device (DASD) 100 includes a recorded disk 110 that is spun at constant speed and a recording head 112 that is positioned on a given track for reading information stored on that track. An analog read signal is obtained by head 112 described by the $(1-D^2)$ operation. The readback signal r(t) is highpass-filtered by an arm electronic (AE) module 114, and its filtered output is applied to a variable gain amplifier (VGA) 116. The amplified read signal is applied to an analog-to-digital converter (ADC) 118 that provides, for example, such as 64 possible 6-bit sampled values. The samples of the ADC 118 are applied to an equalizer 120, such as a 10 tap digital finite impulse response (DFIR) filter 120. The filtered signal from the DFIR filter 120 is applied to a detector (not shown) to provide a detected data output.

The samples of the ADC 118 are applied to a direct equalization control function 122 of the preferred embodiment. Direct equalization control function 122 of the preferred embodiment provides modified tap weights to the DFIR filter 120 for accurate channel equalization in accordance with the preferred embodiment.

In accordance with features of the preferred embodiment, a pseudo-random bit sequence (PRBS) waveform is written to the disk 110. A readback signal consisting of a predefined number of bits, such as a 127 bit PRBS signal is readback from the disk 110 for implementing DFIR filter 120 equalization in accordance with the preferred embodiment.

The direct equalization (DEQ) method of the preferred embodiment iteratively modifies tap weights for DFIR filter 120, for example, a 10-tap digital FIR filter 120 using the sampled dibit response of the PR4 system. A 127-bit pseudo-random bit sequence (PRBS) is used in this method to deconvolve and sample the PR4 dibit response. The dibit samples as well as a sampled error response are used to calculate the gradients for each tap weight of the DFIR filter 120. These tap gradients are then used to modify the tap weights in such a manner as to better equalize the DFIR filter 120.

In accordance with features of the preferred embodiment, channel equalization with the digital FIR (DFIR) filter 120 uses DASD internal circuitry, reduces user interaction, and greatly reduces programming time during manufacturing as compared to known equalization techniques. The method of the preferred embodiment accurately implements channel equalization with the digital FIR filter 120, both quickly and effectively. The method of the preferred embodiment uses a zero-forcing method. This method utilizes a super-averaging of the waveform samples, this combined with the mathematical de-convolution of the dibit response, results in a generally noise free set of samples. The noise free samples are then used for further digital manipulation, and result in more accurate equalization. This design uses a proportional value of the tap gradients to modify the taps, eliminating thresholds. This method also eliminates the need for extensive software programs for channel equalization with the DFIR filter 120, as well as save time during manufacturing programming as compared to known equalization techniques.

In accordance with features of the preferred embodiment, direct equalization control function 122 is an iterative method. Direct equalization control function 122 of the preferred embodiment utilizes the pseudo-random bit sequence (PRBS) that is written onto the hard disk 110. When this sequence waveform is read back the unequalized sample stream are mathematically de-convolved inside the read channel to produce a set of samples that represent the dibit response of a PR4 system. These dibit samples, along with equalized error of the waveform samples, are then correlated to generate gradients for each tap weight used in the digital FIR filter 120. Proportional amounts of these gradients are then added to each tap weight to modify each tap in a direction of better equalization.

This method utilizes three major steps in each iteration including dibit extraction; tap gradient calculation; and tap value modification. Unique features of the direct equalization control function 122 include the use of a pseudo-random bit sequence to extract the dibit points as well as the error points; the use of programmable proportional tap gradients to modify taps; an automatic shut off when equalization is complete; and user programmability.

Figure 2:
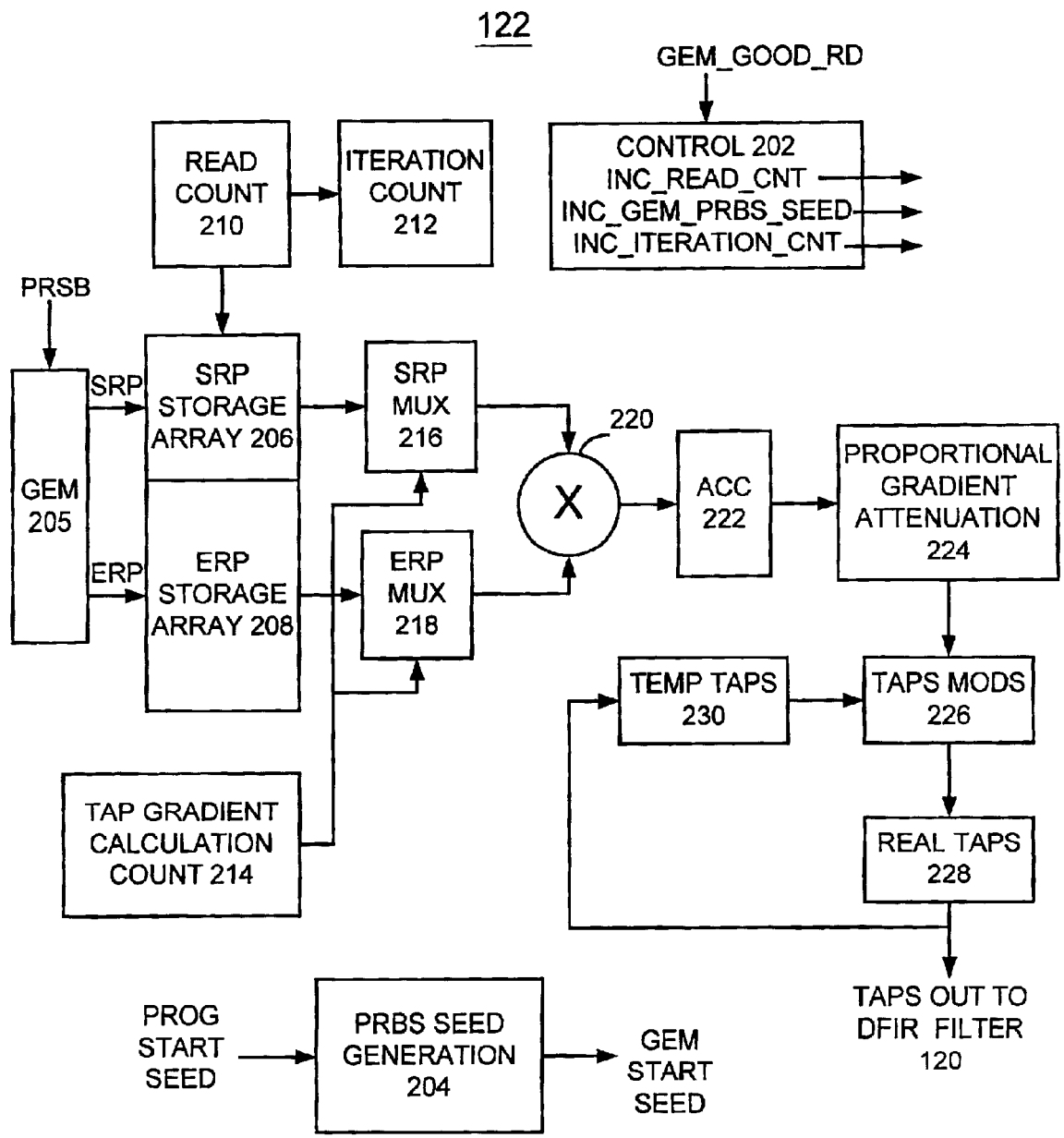
FIG. 2 is a block diagram representation illustrating apparatus for channel equalization with a digital finite impulse response (DFIR) filter using a pseudo random sequence in accordance with the preferred embodiment.

Referring now to FIG. 2, there is shown an exemplary direct equalization control function 122 of the preferred embodiment. Direct equalization control function 122 includes a control circuit 202 receiving a GEM_GOOD_ RD signal and generating a plurality of control signals labeled INC_READ_ CNT; INC_GEM_PRBS_SEED; and INC_ITERATION_CNT. Direct equalization control function 122 includes a PRBS seed generation circuit 204 receiving a programmable start seed and generating a GEM start seed.

DASD 100 includes a General Error Measurement (GEM) facility 205 for error detection and the GEM circuitry is used to generate the dibit and error samples as further described below. Direct equalization control function 122 uses the pseudo-random bit sequence (PRBS) that is written repeatedly throughout a sector on the hard drive disk 110. Data channel circuitry reads this PRBS pattern back, and digitizes the unequalized signal with the ADC 118.

Dibit extraction can be described by the following equations, where:

$X^{inst}{}_a$=Un-Equalized Sample $E^{inst}{}_a$=Error in the Equalized PR4 Sample N*PRBSlen=Integer multiple of PRBS length, (N*127 bits in this case).

$$X^{dibit}{}_a \triangleq \sum_{t=0}^{N*PRBSlen} X^{inst}{}_t * PRBS_{t+a} \quad (1)$$

$$E^{dibit}{}_a \triangleq \sum_{t=0}^{N*PRBSlen} E^{inst}{}_t * PRBS_{t+a} \quad (2)$$

The dibit waveform points, ($X^{dibit}{}_a$), referred to as SRP or Sampled Response Points, for DASD100 consists of 12 samples, (a=0,1,2,3 . . . 7). While the ERP, Error Response Points ($E^{dibit}{}_a$), consists of 21 samples, (a=0,1,2,3 . . . 16). A complete data read of the PRBS must be done to extract each point of the SRP and ERP. This equates to 33 individual reads per iteration. Notice that, for each read, the a-index refers to a phase shift of one bit in the PRBS pattern. This phase shifting is done by programming the system to start at a different seed for every read. The seed is incremented for each subsequent read to extract all the SRP samples. The seed is then returned to the original starting seed and incremented through the sequence again to extract the ERP samples. Note that the first samples extracted for SRP and ERP start with the same seed value provided by the PRBS seed generation circuit 204. At the end of the iteration the seed is returned to the original programmed seed and is ready for the first read of the next iteration.

In order to extract consistent SRP and ERP, it is necessary to distinguish between a good and bad read. The window of accumulation must be continuous and GEM circuit 205 applies the GEM_GOOD_RD signal to the control circuit 202 of the direct equalization control function 122 to indicate a good read.

The GEM circuit 205 applies a SRP input to a SRP storage array 206, such as 8×11-bit storage array, and applies an ERP input to an ERP storage array 208, such as 17×10-bit storage array.

A read count 210 is coupled to an iteration count 212 and also is coupled to the SRP storage array 206 and ERP storage array 208. After a successful read, the control circuit 202 sends a pulse to the read count 210 to increment its value. The read count 210 is a basic 6-bit primitive polynomial counter that starts with a value of 111111. The read count 210 is decoded and the decodes are used to route the incoming GEM values to proper storage array elements of the SRP storage array 206 and ERP storage array 208. When the read count 210 reaches a predefined value, the loading of the SRP storage array 206 and ERP storage array 208 is complete and a tap gradient calculation count 214 is started. When the gradient calculations are complete, the read count 210 is reset to its original starting value and is ready for a next iteration set of read values.

The tap gradient calculation count 214 provides an enable input to a SRP multiplexer 216 coupled to the SRP storage array 206 and an ERP multiplexer 218 coupled to the ERP storage array 208. Direct equalization control function 122 performs tap gradient calculations with a multiplier 220 having inputs coupled to the SRP multiplexer 216 and the ERP multiplexer 218 and an output of multiplier 220 coupled to an accumulator 222. The calculated tap gradient outputs for each tap of the accumulator 222 are attenuated according to a programmable attenuation setting, selected by the user by a proportional gradient attenuation 224.

Once all SRP and ERP samples are extracted and stored in the SRP storage array 206 and the ERP storage array 208, the tap gradients are computed. The gradient calculations can be described by the following correlation equation, where:

CORRlen=Correlation length, (the number of SRP's extracted= 12).

$i$=Number of Taps in DFIR, ($i$=10).

$$\nabla TAPi \triangleq \sum_{t=0}^{CORRlen} X^{dibit}{}_t * E^{dibit}{}_t + i \quad (3)$$

The tap gradient calculation count 214, such as, a 7-bit binary up counter is used to decode which pair of SRP and ERP samples is sent to the multiplier 220 and accumulator 222. The gradient calculator formed by multiplier 220 and accumulator 222 consists of, for example, a 10-bit by 11-bit two's compliment multiplier 220 followed by a 24-bit accumulator 222. The stored SRP and ERP samples are routed to the multiplier 220 in pairs according to equation 3. After the appropriate samples have been correlated, the resulting tap gradient is then attenuated by proportional gradient attenuation 224 and used to modify the tap weight.

The final step in this method is to modify the tap weights. Once the gradient is calculated for a specific tap, a programmable attenuation factor is applied by proportional gradient attenuation block 224 and this new value is added directly to the tap weight by a taps modifications block 226. Tap modifications using the attenuated gradient are implemented as soon as a gradient is calculated. The existing tap value is loaded into a temporary tap weight register 230. The value is modified, simply by adding or subtracting based on the gradient sign in the taps modifications block 226 and loaded into the real tap weight register 228. In order to be more accurate during the modifications, each tap weight is expanded to a 12-bit representation. Of those 12 bits only the top 8 bits are sent to the DFIR filter 120 as the final tap value by a real taps block 228. There is a 3-bit setting used by proportional gradient attenuation block 224 that controls the magnitude by which the tap gradients are attenuated, before the gradient is used to modify the taps. This value is basically a division factor, where the higher the setting the more attenuation is applied. The following table 1 gives the relative divisor value.

TABLE 1

GRADIENT ATTENUATION SETTINGS AND FACTORS

| SETTING | DIVISOR VALUE | SETTING | DIVISOR VALUE | SETTING | DIVISOR SETTING |
|---------|---------------|---------|---------------|---------|-----------------|
| 000     | 256           | 010     | 1024          | 10X     | 4096            |
| 001     | 512           | 011     | 2048          | 11X     | 8192            |

After the tap modifications are complete the iteration is complete, and new SRP and ERP extractions can start over again using the newly modified tap weights.

In operation, the control circuit 202 receives the GEM_GOOD_RD signal from GEM circuit 205 and creates a master good read pulse that is one XTAL period wide. This pulse drives the rest of the sequential logic which increments, decrements, loads and resets various logic throughout the entire direct equalization control function 122. The control circuit 202 also creates signal pulses that start the post iteration activities. After the last read of the iteration, the tap gradient calculation counter 214 is started. This counter 214 is decoded to control the flow of ERP and SRP samples to the gradient calculator formed by multiplier 220 and accumulator 222, as well as create the control pulses for other iteration activities. These include incrementing the iteration counter 212 at the end of the iteration, loading of the temporary tap registers 230, and loading of the new real tap registers 228 when modifications are complete, as well as, indicating the iteration is done and the time is right to reset the read counter 210 and PRBS seed generation 204 for the next iteration. The iteration count 212 is a 9-bit counter representing the number of iterations that have been performed. The iteration count 212 is updated during the post iteration period by the INC_ITERATION_CNT output of the control circuit 202. The iteration count 212 is compared with a programmable maximum iteration setting and when the maximum number of iterations is reached, the direct equalization control function 122 shuts off.

Direct equalization control function 122 sets itself apart from previous equalization designs in several ways. The first is the use of a pseudo-random bit sequence to deconvolve the dibit response. Second is the use of an iterative, zero-forcing algorithm instead of the mean square error method used in previous designs. Another is the use of programmable gradient attenuation function 224 to modify tap weights, instead of thresholds. This allows taps with larger gradients to move in their desired direction faster than taps with smaller gradients. One other unique feature is the flexibility of the circuit to shut itself off when equalization is complete.

While the present invention has been described with reference to the details of the embodiments of the invention shown in the drawing, these details are not intended to limit the scope of the invention as claimed in the appended claims.

What is claimed is:

1. A digital finite impulse response (FIR) filter channel equalization method for a direct access storage device (DASD) data channel comprising the steps of:

obtaining a readback signal of a pseudo random bit sequence;

obtaining samples from said readback signal of said pseudo random bit sequence;

calculating tap gradients responsive to said obtained samples; and modifying tap weights of the digital finite impulse response (FIR) filter responsive to said calculated tap gradients for filtering the obtained samples.

2. A digital finite impulse response (FIR) filter channel equalization method for a direct access storage device (DASD) data channel as recited in claim 1 wherein said pseudo random bit sequence includes a pseudo random pattern of a predefined number of bits.

3. A digital finite impulse response (FIR) filter channel equalization method for a direct access storage device (DASD) data channel as recited in claim 1 wherein the step of obtaining samples from said readback signal of said pseudo random bit sequence includes the step of obtaining unequalized samples from said readback signal.

4. A digital finite impulse response (FIR) filter channel equalization method for a direct access storage device (DASD) data channel as recited in claim 3 wherein the step of obtaining samples from said readback signal of said pseudo random bit sequence includes the step of generating dibit samples and error samples from said unequalized samples from said readback signal.

5. A digital finite impulse response (FIR) filter channel equalization method for a direct access storage device (DASD) data channel as recited in claim 1 wherein the step of calculating tap gradients responsive to said obtained samples includes the step of applying said obtained samples to a bitwise multiply and accumulation circuit.

6. A digital finite impulse response (FIR) filter channel equalization method for a direct access storage device (DASD) data channel as recited in claim 1 wherein the step of obtaining samples from said readback signal of said pseudo random bit sequence includes the step of generating dibit samples and error samples from said unequalized samples from said readback signal and wherein the step of calculating tap gradients responsive to said obtained samples includes the step of applying pairs of said generated dibit samples and error samples to a multiplier; an output of said multiplier coupled to an accumulator.

7. A digital finite impulse response (FIR) filter channel equalization method for a direct access storage device (DASD) data channel as recited in claim 6 wherein the step of applying pairs of said generated dibit samples and error samples to said multiplier includes the step of calculating a two's-compliment of said applied dibit samples and error samples.

8. A digital finite impulse response (FIR) filter channel equalization method for a direct access storage device (DASD) data channel as recited in claim 1 wherein the step of modifying tap weights of the digital finite impulse response (FIR) filter responsive to said calculated tap gradients includes the step of attenuating said calculated tap gradients by a programmable attenuation value.

9. A digital finite impulse response (FIR) filter channel equalization method for a direct access storage device (DASD) data channel as recited in claim 1 wherein the step of obtaining samples from said readback signal of said pseudo random bit sequence includes the step of obtaining dibit waveform points $X^{dibit}{}_a$ is respresented by:

$$X^{dibit}{}_a \triangleq \sum_{t=0}^{N*PRBSlen} x^{inst}{}_t * PRBS_{t+a}$$

where $X^{inst}{}_a$ represents an unequalized sample and N*PRBSlen represents an Integer multiple of a length of said pseudo random bit sequence (PRBS).

10. A digital finite impulse response (FIR) filter channel equalization method for a direct access storage device (DASD) data channel as recited in claim 9 includes the step of obtaining error waveform points $E^{dibit}{}_a$ respresented by:

$$E^{dibit}{}_a \triangleq \sum_{t=0}^{N*PRBSlen} E^{inst}{}_t * PRBS_{t+a}$$

where $E^{inst}{}_a$ represents an error in an equalized PR4 sample.

11. A digital finite impulse response (FIR) filter channel equalization method for a direct access storage device (DASD) data channel as recited in claim 1 wherein the step of wherein the step of obtaining samples from said readback signal of said pseudo random bit sequence includes the step of generating dibit samples $X^{dibit}{}_a$ and error samples $E^{dibit}{}_a$ from said samples from said readback signal and wherein the step of calculating tap gradients responsive to said obtained samples includes the calculation of tap gradients represented by:

$$\nabla TAPi \triangleq \sum_{t=0}^{CORRlen} X^{dibit}{}_t * E^{dibit}{}_{t+i}$$

where CORRlen represents a correlation length of a number of dibit samples $X^{dibit}{}_a$ extracted and i represents a number of taps in the digital finite impulse response (FIR) filter.

12. Apparatus for digital finite impulse response (FIR) filter channel equalization in a direct access storage device (DASD) data channel comprising:

a readback signal of a pseudo random bit sequence;

a General Error Measurement (GEM) circuit for generating a plurality of dibit samples and error samples responsive to said readback signal of said pseudo random bit sequence;

a tap gradients calculator for calculating tap gradients responsive to said generated dibit samples and error samples; and a tap weight modification function for modifying tap weights of the digital finite impulse response (FIR) filter responsive to said calculated tap gradients.

13. Apparatus for digital finite impulse response (FIR) filter channel equalization in a direct access storage device (DASD) data channel as recited in claim 12 wherein said generated dibit samples are represented by $X^{dibit}{}_a$ and said generated error samples are represented by $E^{dibit}{}_a$ and wherein said tap gradients calculator for calculating tap gradients responsive to said generated dibit samples and error samples and wherein said calculation of tap gradients by said tap gradients calculator is represented by:

$$\nabla TAPi \triangleq \sum_{t=0}^{CORRlen} X^{dibit}{}_t * E^{dibit}{}_{t+i}$$

where CORRlen represents a correlation length of a number of dibit samples $X^{dibit}{}_a$ extracted and i represents a number of taps in the digital finite impulse response (FIR) filter.

14. Apparatus for digital finite impulse response (FIR) filter channel equalization in a direct access storage device (DASD) data channel as recited in claim 12 wherein said tap gradients calculator for calculating tap gradients responsive to said generated dibit samples and error samples includes a multiplier with pairs of said generated dibit samples and error samples applied to said multiplier; and an output of said multiplier coupled to an accumulator.

15. Apparatus for digital finite impulse response (FIR) filter channel equalization in a direct access storage device (DASD) data channel as recited in claim 12 wherein said tap gradients calculator for calculating tap gradients responsive to said generated dibit samples and error samples includes a two's compliment multiplier and an output of said multiplier coupled to an accumulator.

16. Apparatus for digital finite impulse response (FIR) filter channel equalization in a direct access storage device (DASD) data channel as recited in claim 12 wherein said tap weight modification function for modifying tap weights of the digital finite impulse response (FIR) filter responsive to said calculated tap gradients includes an attenuation function for attenuating said calculated tap gradients by a programmable attenuation value.

17. Apparatus for digital finite impulse response (FIR) filter channel equalization in a direct access storage device (DASD) data channel as recited in claim 12 further includes an iteration counter; said iteration counter being incremented responsive to said tap gradients calculator completing an iteration.

18. Apparatus for digital finite impulse response (FIR) filter channel equalization in a direct access storage device (DASD) data channel as recited in claim 17 further includes said iteration counter for identifying a maximum number of iterations to stop equalization.

\* \* \* \* \*